United States Patent [19]

Arnold-Mauer et al.

[11] Patent Number: 5,189,099
[45] Date of Patent: Feb. 23, 1993

[54] THERMOPLASTIC MOLDING MATERIALS BASED ON POLYESTERS AND POLYPHENYLENE ETHERS

[75] Inventors: Baerbel Arnold-Mauer, Kallstadt; Klaus Bronstert, Carlsberg; Ehrenfried Baumgartner, Roedersheim-Gronau, all of Fed. Rep. of Germany

[73] Assignee: BASF Aktiengesellschaft, Ludwigshafen, Fed. Rep. of Germany

[21] Appl. No.: 699,527

[22] Filed: May 14, 1991

[30] Foreign Application Priority Data

May 15, 1990 [DE] Fed. Rep. of Germany ....... 4015533

[51] Int. Cl.$^5$ .................... C08L 71/12; C08L 67/03
[52] U.S. Cl. .......................... 525/68; 525/92; 525/132; 525/397; 525/905
[58] Field of Search .................. 525/68, 92, 132, 397, 525/905

[56] References Cited

U.S. PATENT DOCUMENTS

| | | | |
|---|---|---|---|
| 3,819,759 | 6/1974 | Weaver et al. | 524/141 |
| 4,866,130 | 9/1989 | Brown et al. | 525/92 |
| 4,972,023 | 11/1990 | Bronstert | 525/374 |
| 4,988,773 | 1/1991 | Bronstert | 525/333.2 |

OTHER PUBLICATIONS 9075 662–Japanese Abstract.
57/200447–Japanese Abstract.
129 342/87 Japanese Abstract.
129 343/87 Japanese Abstract.
209 165/87 Japanese Abstract.
3066-249 A Japanese Abstract.
1036-644 A Japanese Abstract.

*Primary Examiner*—James J. Seidleck
*Assistant Examiner*—Thomas Hamilton, III
*Attorney, Agent, or Firm*—Keil & Weinkauf

[57] ABSTRACT

Thermoplastic molding materials contain
A) from 5 to 94.9% by weight of a polyester,
B) from 5 to 94.9% by weight of a polyphenylene ether,
C) from 0.1 to 50% by weight of a homopolymer or copolymer obtainable by anionic polymerization of a vinylaromatic compound or a diene, or a mixture thereof, carrying primary or secondary amino groups at the chain ends,
D) from 0 to 40% by weight of an impact-modifying rubber,
E) from 0 to 60% by weight of conventional additives and processing assistants.

7 Claims, No Drawings

THERMOPLASTIC MOLDING MATERIALS BASED ON POLYESTERS AND POLYPHENYLENE ETHERS

The present invention relates to thermoplastic molding materials containing

A) from 5 to 94.9% by weight of a polyester,
B) from 5 to 94.9% by weight of a polyphenylene ether,
C) from 0.1 to 50% by weight of a homopolymer or copolymer obtainable by anionic polymerization of a vinylaromatic compound or a diene, or a mixture thereof, carrying primary or secondary amino groups at the chain ends,
D) from 0 to 40% by weight of an impact-modifying rubber,
E) from 0 to 60% by weight of conventional additives and processing assistants.

The present invention furthermore relates to a method of using these molding materials for producing fibers, films or moldings, and to the moldings obtainable from the molding materials according to the invention.

Polymer blends of polyphenylene ethers and polyesters have good mechanical properties, such as low water absorption capacity and high heat distortion resistance. Since the various polymer matrices are incompatible, conversion into moldings usually causes problems, and the low phase adhesion of the blend components results in high brittleness of the moldings.

U.S. Pat. No. 3,819,759 discloses molding materials comprising polyesters with polyphenylene ethers and/or polycarbonates, with processing properties improved by addition of triaryl phosphates. However, it is not possible to vary the mixing ratios at will, since relatively large amounts of triaryl phosphates significantly impair the compatibility of the mixtures and the mechanical properties of the moldings.

These disadvantages are also evident in the mixtures of polytetramethylene terephthalate and polyphenylene ethers described in JP-A 49/75662.

JP-A 57/200447 discloses the preparation of blends of PPE and polyesters using a specific solution process. In the case of processing in the melt, which is necessary, for example, during compounding in extruders, the two polymer components separate again.

JP-A 62/129342, JP-A 62/129343, JP-A 62/209165, JP-A 63/066249 and JP-A 01/36644 disclose blends of polyesters and polyphenylene ethers which contain, as phase-compatibility promoters, copolymers of styrene with monomers carrying functional groups. Mention is made of carboxyl-, hydroxyl-, epoxy- and amino-functional monomers.

The mechanical properties of the moldings produced from these blends are in need of further improvement, since these graft copolymers (comb polymers) only permit a coarse phase morphology and consequently non-ideal phase adhesion of the two polymer matrices. In addition, the functional groups of the monomers do not always react to completion, so that highly yellowed moldings are produced on processing, in particular in the case of amino-containing copolymers.

It is therefore an object of the present invention to provide thermoplastic molding materials comprising polyphenylene ethers and polyesters which have good processing properties and whose moldings have good mechanical properties, in particular good elongation at break, and a pale inherent color.

We have found that this object is achieved by the molding materials defined at the outset.

Preferred molding materials of this type and the use thereof are indicated in the subclaims.

As component A), the molding materials according to the invention contain from 5 to 94.9% by weight, preferably from 10 to 89.5% by weight, in particular from 20 to 78% by weight, of a thermoplastic polyester.

In general, the polyesters used are based on an aromatic dicarboxylic acid and an aliphatic or aromatic dihydroxyl compound.

A first group of preferred polyesters comprises polyalkylene terephthalates having from 2 to 10 carbon atoms in the alcohol moiety.

Polyalkylene terephthalates of this type are known per se and are described in the literature. They contain, in the main chain, an aromatic ring originating from the aromatic dicarboxylic acid. The aromatic ring may also be substituted, e.g. by halogen, such as chlorine or bromine, or by $C_1$-$C_4$-alkyl, such as methyl, ethyl, i- or n-propyl, or n-, i- or t-butyl.

These polyalkylene terephthalates can be prepared by reacting an aromatic dicarboxylic acid, an ester thereof or another ester-forming derivative thereof with an aliphatic dihydroxyl compound in a conventional manner.

Examples of preferred dicarboxylic acids are naphthalenedicarboxylic acid, terephthalic acid and isophthalic acid, and mixtures thereof. Up to 30 mol-% preferably not more than 10 mol-%, of the aromatic dicarboxylic acid may be replaced by an aliphatic or cycloaliphatic dicarboxylic acid, such as adipic acid, azelaic acid, sebacic acid, a dodecanedioic acid or a cyclohexanedicarboxylic acid.

Preferred aliphatic dihydroxyl compounds are diols having from 2 to 6 carbon atoms, in particular 1,2-ethanediol, 1,4-butanediol, 1,6-hexanediol, 1,4-hexanediol, 1,4-cyclohexanediol and neopentyl glycol and mixtures thereof.

Examples of particularly preferred polyesters (A) are polyalkylene terephthalates derived from alkanediols having from 2 to 6 carbon atoms. Of these, particular preference is given to polyethylene terephthalate and polybutylene terephthalate.

The relative viscosity of the polyester A) is generally in the range from 1.2 to 1.8 (measured in 0.5% strength by weight solution in a phenol/o-dichlorobenzene mixture (weight ratio 3:2) at 25° C.).

A further group comprises fully aromatic polyesters derived from an aromatic dicarboxylic acid and an aromatic dihydroxyl compound.

Suitable aromatic dicarboxylic acids are the compounds described above under polyalkylene terephthalates. Preference is given to mixtures comprising from 5 to 100 mol-% of isophthalic acid and from 0 to 95 mol-% of terephthalic acid, in particular mixtures comprising approximately equivalent amounts of these two acids.

The aromatic dihydroxyl compounds preferably have the general formula I

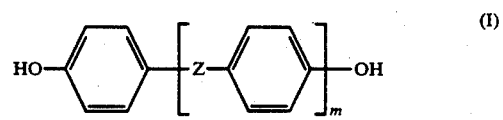

where Z is alkylene or cycloalkylene having up to 8 carbon atoms, arylene having up to 12 carbon atoms, carbonyl, sulfonyl, oxygen or sulfur, or a chemical bond, and m is 0 or 1. The compounds I may also be substituted on the phenylene groups by $C_1$-$C_6$-alkyl, fluorine, chlorine or bromine.

These compounds are derived, for example, from dihydroxydiphenyl,
di(hydroxyphenyl)alkane,
di(hydroxyphenyl)cycloalkane,
di(hydroxyphenyl)sulfide,
di(hydroxyphenyl)ether,
di(hydroxyphenyl)ketone,
di(hydroxyphenyl)sulfoxide,
$\alpha,\alpha'$-di(hydroxyphenyl)dialkylbenzene,
resorcinol and
hydroquinone, and ring-alkylated or ring-halogenated derivatives thereof.

Of these, preference is given to
4,4'-dihydroxydiphenyl,
2,4-di(4'-hydroxyphenyl)-2-methylbutane,
$\alpha,\alpha'$-di(4-hydroxyphenyl)-p-diisopropylbenzene,
2,2-di(3'-methyl-4'-hydroxyphenyl)propane and
2,2-di(3'-chloro-4'-hydroxyphenyl)propane,
and particular preference is given to
2,2-di(4'-hydroxyphenyl)propane,
2,2-di(3',5'-dichlorodihydroxyphenyl)propane,
1,1-di(4'-hydroxyphenyl)cyclohexane and
2,2-di(3',5'-dimethyl-4'-hydroxyphenyl)propane,
and mixtures thereof.

It is of course also possible to employ mixtures of polyalkylene terephthalates and fully aromatic polyesters. These mixtures generally contain from 20 to 98% by weight of the polyalkylene terephthalate and from 2 to 80% by weight of the fully aromatic polyester.

For the purposes of the present invention, polyesters are also polycarbonates obtainable by polymerizing an aromatic dihydroxyl compound, in particular bis(4-hydroxyphenyl)-2,2-propane (bisphenol A) or a derivative thereof with, for example, phosgene. Corresponding products are known per se, are described in the literature and for the most part are also commercially available. The amount of polycarbonate is from 1 to 70 parts by weight, preferably from 2 to 60 parts by weight, based on 100 parts by weight of the polyester of component A) of the thermoplastic molding material according to the invention.

The polyphenylene ether B) present in the molding materials according to the invention is known per se, and is a compound based on a substituted, in particular disubstituted, polyphenylene ether, the ether oxygen of one unit being bonded to the benzene ring of the adjacent unit. Preference is given to polyphenylene ethers which are substituted in the 2- and/or 6-position to the oxygen atom. Examples of substituents are halogen, such as chlorine or bromine, and alkyl having from 1 to 4 carbon atoms and preferably no tertiary hydrogen in the $\alpha$-position, e.g. methyl, ethyl, propyl and butyl. The alkyl moieties may in turn be substituted by halogen, such as chlorine or bromine, or by hydroxyl. Other examples of possible substituents are alkoxy, preferably having up to 4 carbon atoms, or phenyl which is unsubstituted or substituted by halogen and/or alkyl. Also suitable are copolymers of different phenols, e.g. copolymers of 2,6-dimethylphenol and 2,3,6-trimethylphenol. It is of course also possible to employ mixtures of different polyphenylene ethers.

Examples of polyphenylene ethers are poly(2,6-dilauryl-1,4-phenyl ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether) poly(2,6-dichloro-1,4-phenylene ether), poly(2-methyl-6-phenyl-1,4-phenylene ether), poly(2,6-dibenzyl-1,4-phenylene ether), poly(2-ethoxy-1,4-phenylene ether), poly(2-chloro-1,4-phenylene ether) and poly(2,5-dibromo-1,4-phenylene ether). Preference is given to polyphenylene ethers in which the substituents are alkyl having from 1 to 4 carbon atoms, such as poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether) and poly(2-ethyl-6-propyl-1,4-phenylene ether).

For the purposes of the present invention, polyphenylene ethers may also have been modified by means of a monomer such as fumaric acid, maleic acid or maleic anhydride.

Polyphenylene ethers of this type are described inter alia, in WO 87/00540.

With respect to the physical properties of the polyphenylene ethers, those are preferred which have a limiting viscosity of from 0.4 to 0.7 dl/g, measured in chloroform at 30° C.

Component B) is present in the molding materials according to the invention in an amount from 5 to 94.9% by weight, preferably from 10 to 89.5% by weight, in particular from 20 to 78% by weight, based on the total weight of components A) to C) and, if used, D) and E).

The polyphenylene ethers B) may contain up to 50% by weight, preferably up to 10% by weight of a vinylaromatic polymer which is different from component C). Examples of these are polystyrene, poly-$\alpha$-methylstyrene and poly-p-methylstyrene, of which polystyrene is preferred. It is also possible to use vinylaromatic polymers prepared in the presence of from 2 to 20% by weight of a rubber-elastic polymer. Suitable examples of the latter are styrene-butadiene polymers, polybutadiene and isoprene-styrene polymers; these may be fully or partially hydrogenated if diene blocks are used.

As component C), the molding materials according to the invention contain a homopolymer or copolymer obtainable by anionic polymerization of a vinylaromatic compound or a diene, or a mixture thereof, carrying primary or secondary amino groups at the chain ends.

For the purposes of the present invention, homopolymer, copolymers and block copolymers comprising vinylaromatic compounds and/or dienes are known polymers of this type which can be obtained anionically, e.g. using organoalkali metal initiators, from the corresponding monomers. Processes of this type are known, and further details are thus superfluous (cf., for example, GB patent 1,444,680 and Journal of Applied Polymer Science, 22 [1978], pages 2007 to 2913).

Particularly suitable vinylaromatic compounds are styrene, various alkylstyrenes, which may also be substituted by halogen, or vinylnaphthalene, and particularly suitable dienes are butadiene, isoprene, 2,3-dimethylbutadiene, piperylene, phenylbutadiene and other anionically polymerizable conjugated $C_4$- to $C_{12}$-dienes. Besides the respective homopolymers, copolymers and the known block copolymers of vinylaromatic compounds and dienes are also suitable, it being possible, depending on the choice of initiator and solvent, to obtain block copolymers or copolymers having a predominantly random distribution of the monomers.

The polymers generally have a mean molecular weight (weight average $\overline{M}_w$) of from 500 to 500,000, preferably from 20,000 to 400,000, in particular from 50,000 to 300,000, determined by gel permeation chromatography (GPC) and comparison with standardized polymers suitable for calibration (cf. G. Glöckner, Polymercharakterisierung durch Flüssigkeitchromatographie, Verlag A. Hüthig, Heidelberg, 1982. The measurements are usually carried out in 0.25% strength by weight tetrahydrofuran solution at 23° C. and a flow rate of 1.2 ml/min).

The preferred homopolymer is polystyrene and preferred copolymers are block copolymers made from styrene and butadiene, with any desired proportions of styrene and butadiene blocks. Particular preference is given to block copolymers comprising from 30 to 70% by weight, in particular from 40 to 60% by weight, of polystyrene and from 30 to 70% by weight, in particular from 40 to 60% by weight, of polybutadiene, since these, if desired, ensure particularly good phase adhesion of components A) and B) to C) after modification by means of amino groups.

Component C) is prepared by conventional processes, either from a living, anionically polymerized or alkali-metallated homopolymer, copolymer and/or block copolymer comprising a vinylaromatic compound and/or a diene (cf. the literature cited at the outset and J. M. Malan et al., Chem. Rev. 69 (1969) (5), pages 693 to 755). To this end, the monomers are subjected to anionic polymerization in the presence of an alkali metal or an alkyl or aryl derivative thereof, in particular in the presence of an alkyl derivative of lithium, such as sec.-butyllithium, in an inert solvent, such as an aliphatic or aromatic hydrocarbon, in particular hexane, cyclohexane, benzene or toluene, or in the presence of tetrahydrofuran. These processes give polymers which contain metals bonded to the end groups.

However, it is also possible to prepare a homopolymer, copolymer and/or block copolymer from a vinylaromatic compound and/or a diene and subsequently to metallate this polymer using an alkali metal or a strong organometallic base. Polymers metallated in this way contain the organometallic groups distributed randomly along the chain.

In a preferred process, a living anionic polymer chain is reacted with an aziridine or diaziridine and subsequently with a nucleophilic compound.

Component C) generally contains on average from 1 to 10 functional amino groups per macromolecule. This means that, based on the sum of all macromolecules, each macromolecule contains, on statistical average, from 1 to 10 functional groups.

Preference is given to polymers C) which contain from 1 to 6, in particular from 1 to 4, of the functional amino groups. The preferred preparation process using living, anionic polymer chains ensures that the primary or secondary amino groups are at the beginning or end of the chains, which results in particularly good phase adhesion to components A) and B).

Suitable compounds for reaction with the anionic polymer chain in the presence of a solvent are the aziridines and diaziridines of the formulae (I) to (III) below:

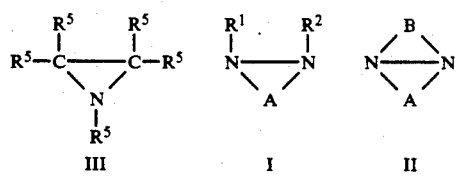

where
$R^1$ and $R^2$ are alkyl or aryl,
A is a single-membered, substituted or unsubstituted carbon bridge,
B is a 2- to 12-membered bridge, of which at least the members closest to the nitrogen atoms comprise

free radicals, where $R^3$ and $R^4$ may be identical or different and are hydrogen, alkyl, cycloalkyl or aryl, and the members furthest from the nitrogen atoms may be —C($R^3$,$R^4$)-free radicals or ether or N-alkyl- or -arylimino groups, and
$R^5$ is hydrogen, alkyl or aryl having 1 to 16 carbon atoms.

Preferred aziridines of the general formula III are 1,2,2-trimethylaziridine and 1,2,2-triethylaziridine.

Examples of preferred diaziridines of the general formula I or II are 1-propyldiaziridine  a

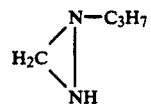

1,2-dibutyldiaziridine  b

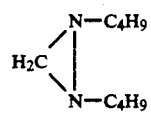

1,5-diazabicyclo(3,1,0)hexane  c

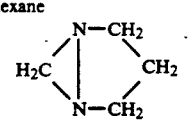

6,6-dimethyl-1,5-diazabicyclo(3,1,0)hexane  d

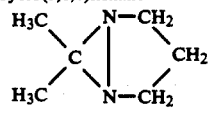

1,2-dimethyl-3-methyl-3-ethyl-diaziridine  e

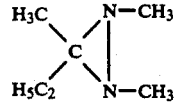

1,2-dimethyl-1,2-diazaspirol(2,3)octane  f

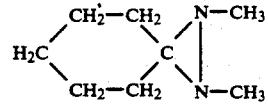

1,2-dibutyl-3-propyl-diaziridine  g

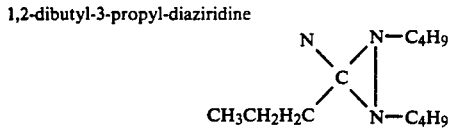

3,6-dimethyl-1,3,5-triazabicyclo(3,1,0)hexane  h

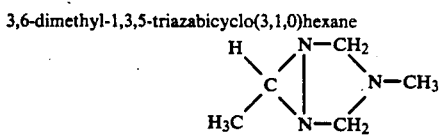

6-methyl-3-oxa-1,5-diazabicyclo(3,1,0)hexane  i

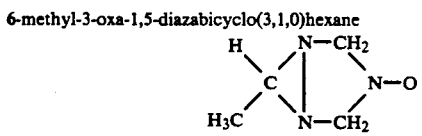

6,6-pentamethylene-1,5-diazabicyclo(3,1,0)hexane  j

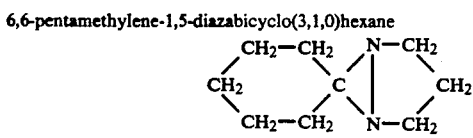

Processes for the preparation of aziridines and diaziridines are known in general terms. Further details are available in EP-A 211 395 and Ichimura et al., Bull. Chem. Soc. Jpn. 40, 432 (1967).

Suitable solvents are aliphatic or aromatic hydrocarbons, such as hexane, cyclohexane, benzene, toluene, etc. The reaction is preferably carried out in the absence of water and in an inert atmosphere, e.g. under pure nitrogen, at from $-70°$ to $100°$ C., preferably from $0°$ to $60°$ C. The reaction with organometallic groups of the polymer involves cleavage of the N—N bond, the polymer radical adding to one nitrogen and the metal, e.g. lithium, to the other nitrogen.

The reaction proceeds at a fast rate and is quantitative. It is advantageous that it requires only a slight excess, if any, and the reacted polymers are thus virtually uncontaminated by unreacted aziridine. Living polymer solutions, which have an intense orange-red color if the chain end comprises styrene or a substitution product thereof, can be titrated, for example, with the aziridines to disappearance of the color.

Subsequent reaction with a nucleophilic compound replaces the metal cation by hydrogen to give primary or secondary amino groups and metal salts.

Suitable nucleophilic compounds are water, alcohols, ethanol and methanol being particularly preferred, concentrated hydrochloric acid, 80% strength by weight of acetic acid, acetone and chloroform.

Usually, the nucleophilic compound simultaneously functions as the precipitant. Work-up is effected in the usual manner.

Component C) may also have been impact modified, but this is not preferred. Such polymers are generally known to those skilled in the art as high impact polystyrene or the corresponding styrene derivatives. The polymers may be prepared in the presence of an impact-modified rubber or blended with grafted rubbers. Examples of suitable rubber-like polymers are polybutadiene, styrene-butadiene, acrylonitrile-butadiene, ethylene-propylene-polyacrylate and polyisoprene rubbers.

These may also be employed in ungrafted form for impact modification of component B).

In this case, an impact-modifying rubber D) may be added in addition to components A), B) and C). Examples of such rubbers are polybutadiene rubbers, acrylate rubbers, styrene-butadiene rubbers, polybutene rubbers, hydrogenated styrene-butadiene rubbers, acrylonitrile-butadiene rubbers, ethylene-propylene rubbers, polyisoprene rubbers, styrene-grafted ethylene-propylene rubbers, thermoplastic ethylene-propylene rubbers, thermoplastic polyester elastomers, ethylene rubbers and ionomers, styrene-butadiene block copolymers, e.g. AB, ABA and ABA tapering and star block copolymers, and similar isoprene block polymers, and hydrogenated or partially hydrogenated block copolymers. Of these, preference is given to block copolymers containing styrene and butadiene.

Particular preference is given to rubbers which are usually employed for the impact modification of polyesters.

Specific examples of graft copolymers comprising $D_1$) from 60 to 99% by weight of an elastomeric component built up from acrylates, methacrylates and/or conjugated dienes, and if desired, further comonomers, as the graft dienes, and if desired, further comonomers, as the graft base and $D_2$) from 1 to 40% by weight, preferably from 2 to 10% by weight, of an epoxy-containing monomer as the graft.

The elastomeric component (rubber component $D_1$) generally has a glass transition temperature of below $0°$ C., preferably below $-20°$ C. Preferred rubber components are homopolymers comprising alkyl acrylates and/or alkyl methacrylates having from 1 to 8 carbon atoms in the alkyl moiety, and/or homopolymers and/or copolymers of conjugated dienes, e.g. 1,3-butadiene and isoprene. A particularly preferred example is a rubber component (elastomer) built up from polybutadiene and/or poly-n-butyl acrylate.

If desired, further comonomers, preferably vinylaromatic monomers having up to 12 carbon atoms, e.g. styrene or mixtures of styrene and acrylonitrile, can be employed in the preparation of the elastomeric component.

Suitable monomers as component $D_2$) are in principle all those which contain epoxide groups and can be grafted on to the graft base $D_1$).

Merely as representatives of a large number of suitable epoxy-containing monomers, mention is made here of glycidyl derivatives, in particular glycidyl acrylates and/or glycidyl methacrylates, which are preferred due to their ready availability.

Processes for the preparation of such graft copolymers are known per se.

The proportion of the impact-modifying rubber D) is not crucial, but is generally not more than 40% by weight, preferably from 0 to 30% by weight, in particular from 4 to 20% by weight, based on the total weight of components A) to E).

As the further component E), the thermoplastic molding materials according to the invention may contain conventional additives and processing assistants in effective amounts. Their proportion is preferably up to 50% by weight, particularly preferably up to 20% by weight. Merely by way of example, mention is made here of heat and light stabilizers, lubricants, mold-release agents, colorants, e.g. dyes and pigments, reinforcing agents, such as glass fibers, asbestos fibers, carbon fibers, aromatic polyamide fibers and/or fillers, gypsum fibers, synthetic calcium silicates, kaolin, calcined kaolin, wollastonite, talc, chalk, flameproofing agents, such as inorganic and organic phosphorus compounds, e.g. phosphates, phosphoric acid esters, phosphorus acid esters, phosphinic acid esters, phosphonous acid esters and organic phosphine oxide. In addition further low- or high-molecular-weight polymers may be present in the molding materials according to the invention as additives.

The thermoplastic molding materials according to the invention are expediently prepared by mixing the components at from 250° to 320° C. in a conventional mixer, e.g. a kneader, Banbury mixer or single-screw extruder, preferably in a twin-screw extruder. Vigorous mixing is necessary in order to obtain the most homogeneous molding material possible. The sequence of mixing of the components may be varied; two or possibly three components may be premixed or all the components may be mixed together.

The thermoplastic molding materials according to the invention can, for example, be injection molded or extruded to give moldings having good mechanical properties and, in particular, improved elongation at break and a pale inherent color.

Moreover, the molding materials according to the invention can be processed without difficulty since the polymer matrices no longer have any tendency toward separation.

EXAMPLES

Component A)

Polybutylene terephthalate having a relative viscosity $\eta_{rel}$ of 1.60 (measured in 0.5% strength by weight solution in a phenol/o-dichlorobenzene mixture (weight ratio 3:2) at 25° C.).

Component B)

90% by weight of poly(2,6-dimethyl-1,4-phenylene ether) having a relative viscosity $\eta_{rel}$ of 0.56 (measured in 1% strength by weight solution in $CHCl_3$ at 30° C.) and 10% by weight of polystyrene (melt flow index MFI at 200° C. and a load of 5 kg=2 kg/10 min) were melted at 270° C. in a twin-screw extruder, homogenized at 280° C. and subsequently degassed under reduced pressure in a degassing zone at 300° C. The mean residence time in the extruder was 1.5 minutes.

Component C1)

7000 ml of purified anhydrous cyclohexane and 4.4 ml of a 1.4 molar solution of sec.-butyllithium in heptane (6.22 mmol) as initiator were introduced under pure nitrogen into a temperature-controlled stirred reactor.

1320 ml (1200 g) of styrene were metered in at 55°–70° C. over the course of 10 to 15 minutes. The polymerization was complete after a further 30 minutes at 70° C.

A sample was removed from the reactor in order to determine the molecular weight.

0,626 ml (7.46 mmol) of 1-propyldiaziridine were subsequently added at 40° C., and the reaction solution was left at 40° C. for 1 hour. After 8 to 10 hours at 40° C., the reaction solution was diluted with cyclohexane in the ratio 1:1 and subsequently precipitated using an approximately 5-fold amount of ethanol (about 60 l). The precipitated polymer was filtered off and dried under reduced pressure at 70° C. The amino-terminated polystyrene had a mean molecular weight ($\overline{M}_w$, weight average) of 220,000.

N content theoretical: 0.015%; found: 0.014%.

Nitrogen content was determined by the Kjeldahl method.

Component C2)

The preparation was similar to that of component C1).

The amounts used were:
6000 ml of cyclohexane
2383 ml (=2166 g) of styrene
17.1 ml (24.1 mmol) of a 1.4 molar solution of sec.-butyllithium in heptane
2.4 ml (28.9 mmol) of 1-propyldiaziridine
about 8 l of cyclohexane
60 l of ethanol.

The amino-terminated polystyrene had an $\overline{M}_w$ of 95,000.

N content theoretical: 0.031%; found: 0.037%.

Component C3)

A styrene-butadiene two-block copolymer (weight ratio 4:6) having an $\overline{M}_w$ of 243,000 was prepared by introducing 7000 ml of methylcyclohexane and 407 g (508 ml) of styrene into a temperature-controlled stirred reactor, and adding 3.4 ml of a 1.4 molar solution of sec-butyllithium (=4.8 mmol) in hexane at 50° C. The formation of a polystyrene-lithium block was complete after 1 hour at 65° C.

Purified monomeric 1,3-butadiene (826 ml=537 g) was subsequently metered into the reactor, and the mixture was polymerized at from 60° to 65° C. until reaction was complete, with formulation of chains comprising 2 segments of polystyrene-polybutadienyllithium. The polymerization was complete after 1 hour. 0.403 ml (4.8 mmol) of 1-propyldiaziridine were then added at 40° C. After from 8 to 10 hours, the solution of the amino-terminated block copolymer was diluted with methylcyclohexane in the ratio of 1:1 and subsequently precipitated in about 60 l of ethanol. The product was dried at 70° C. under reduced pressure.

N content theoretical: 0.018%; found: 0.016%.

Components C1* to C11*)

The comparative components were prepared by free-radical emulsion polymerization at elevated temperature using tert-dodecyl mercaptan as regulator and potassium peroxodisulfate at initiator.

The compositions are shown in Table 1.

TABLE 1

| Component | Proportion of styrene (% by weight) | Proportion of comonomer (% by weight) | Fikentscher K value[b] |
|---|---|---|---|
| C1* | 99 | 1 glycidyl methacrylate | 46 |
| C2* | 97 | 3 glycidyl methacrylate | 45 |
| C3* | 95 | 5 glycidyl methacrylate | 45 |
| C4* | 93 | 7 glycidyl methacrylate | 46 |
| C5* | 97 | 3 maleic anhydride[a] | |
| C6* | 95.2 | 5.8 maleic anhydride[a] | |
| C7* | 86 | 14 maleic anhydride[a] | |
| C8* | 99.5 | 0.5 methacrylamide | 41 |
| C9* | 99 | 1 methacrylamide | 41 |
| C10* | 95 | 5 methacrylamide | 40 |
| C11* | 90 | 10 methacrylamide | 42 |

[a] Dylark ® 132, 232 or 332 from Shell AG
[b] The K value was detected in 0.5% strength by weight solution in $CHCl_3$ at 25° C.

Component D1)

An emulsion graft rubber was prepared as follows:

286.68 g of n-butyl acrylate and 5.85 g of dihydroxydicyclopentadiene acrylate were polymerized at 62° C. in 589.59 g of water using 2.78 g of a $C_{12}$-$C_{18}$-paraffinsulfonic acid as emulsifier, 1.64 g of potassium persulfate as catalyst and 0.95 g of sodium bicarbonate as pH regulator. After 6.5 hours, 89.56 g of styrene and 38.38 g of acrylonitrile were added to the reaction mixture over the course of 3.5 hours, and the polymerization was then continued for a further 1.5 hours at 62° C.

The dispersion had a $d_{50}$ value of the weight distribution of 0.35 μm.

Component D2)

A styrene-butadiene four-block copolymer containing 45% by weight of polystyrene, with a mean molecular weight of the overall block copolymer of 70,000.

Preparation of the molding materials

Components A) and D) were melted and homogenized in a twin-screw extruder at 280° C. The melt extrudate was passed through a water bath and granulated.

The dried granules were injection-molded at 280° C. to give small standard specimens.

The elongation at break was determined in accordance with DIN 53455.

The mean particle size (weight average) of the disperse soft component phase was determined by counting and averaging the particles in the same size class (constant interval width) from photomicrographs of thin sections taken using an electron microscope. The volumes of the particles (cube of the apparent diameter) within the intervals are used to determined the distribution sum curve. At an ordinate value of 50%, the equivalent diameter can be read off the abscissa. The mean diameters indicated are means of at least 5000 particles.

The inherent color was assessed visually by division into categories 1 to 6, 1 corresponding to the palest inherent color.

The composition of the molding materials and the results of the measurements are shown in Table 2.

TABLE 2

| No. | Composition (% by weight) | | | | | Elongation at break [%] | Color | $d_{50}$ value [μm] |
|---|---|---|---|---|---|---|---|---|
| 1* | 80 A) | 20 B) | — | | | 1 | 1 | 10 |
| 2 | 64 A) | 16 B) | 20 C1) | | | 4 | 1 | 4 |
| 3 | 64 A) | 16 B) | 20 C2) | | | 5 | 1 | 2 |
| 4* | 20 A) | 80 B) | — | | | 1 | 1 | 5 |
| 5 | 18 A) | 72 B) | 10 C2) | | | 3 | 1 | 3 |
| 6 | 16 A) | 64 B) | 20 C2) | | | 5 | 1 | 2 |
| 7 | 14 A) | 56 B) | 30 C2) | | | 6 | 1 | 0,5 |
| 8* | 64 A) | 18 B) | — | 16 D1) + | 2 D2) | 3 | 1 | 10 |
| 9 | 51,2 A) | 14,4 B) | 20 C1) | 12,8 D1) + | 1,6 D2) | 18 | 1 | 4 |
| 10 | 51,2 A) | 14,4 B) | 20 C2) | 12,8 D1) + | 1,6 D2) | 22 | 1 | 2 |
| 11* | 16 A) | 72 B) | — | 4 D1) + | 8 D2) | 3 | 1 | 5 |
| 12 | 14,4 A) | 64,8 B) | 10 C2) | 3,6 D1) + | 7,2 D2) | 15 | 1 | 3 |
| 13 | 12,8 A) | 57,6 B) | 20 C2) | 3,2 D1) + | 6,4 D2) | 23 | 1 | 2 |
| 14 | 11,2 A) | 50,4 B) | 30 C2) | 2,8 D1) + | 5,6 D2) | 25 | 1 | 0,5 |
| 15 | 48 A) | 36 B) | 30 C2) | 12 D1) + | 4 D2) | 24 | 1 | 0,6 |
| 16 | 11,2 A) | 50,4 B) | 30 C3) | 2,8 D1) + | 5,6 D2) | 27 | 1-2 | 0,5 |
| 17* | 36 B) | 48 A) | — | 12 D1) | 4 D2) | 3 | 1 | 10 |
| 18* | 36 B) | 48 A) | 5 C1*) | 12 D1) | 4 D2) | 5 | 1 | 10 |
| 19* | 36 B) | 48 A) | 10 C1*) | 12 D1) | 4 D2) | 8 | 1 | 9 |
| 20* | 36 B) | 48 A) | 15 C1*) | 12 D1) | 4 D2) | 10 | 1-2 | 8 |
| 21* | 36 B) | 48 A) | 5 C2*) | 12 D1) | 4 D2) | 9 | 1 | 9 |
| 22* | 36 B) | 48 A) | 10 C2*) | 12 D1) | 4 D2) | 10 | 1 | 8 |
| 23* | 36 B) | 48 A) | 15 C2*) | 12 D1) | 4 D2) | 11 | 1-2 | 7 |
| 24* | 36 B) | 48 A) | 5 C3*) | 12 D1) | 4 D2) | 10 | 1 | 7 |
| 25* | 36 B) | 48 A) | 10 C3*) | 12 D1) | 4 D2) | 12 | 1 | 6 |
| 26* | 36 B) | 48 A) | 15 C3*) | 12 D1) | 4 D2) | 13 | 1-2 | 5 |
| 27* | 36 B) | 48 A) | 5 C4*) | 12 D1) | 4 D2) | 11 | 1 | 6 |
| 28* | 36 B) | 48 A) | 10 C4*) | 12 D1) | 4 D2) | 13 | 1 | 5 |
| 29* | 36 B) | 48 A) | 15 C4*) | 12 D1) | 4 D2) | 14 | 1-2 | 4 |
| 30* | 36 B) | 48 A) | 10 C5*) | 12 D1) | 4 D2) | 9 | 1-2 | 10 |
| 31* | 36 B) | 48 A) | 10 C6*) | 12 D1) | 4 D2) | 10 | 2 | 10 |
| 32* | 36 B) | 48 A) | 10 C7*) | 12 D1) | 4 D2) | 10 | 2 | 10 |
| 33* | 36 B) | 48 A) | 10 C8*) | 12 D1) | 4 D2) | 10 | 3-4 | 10 |
| 34* | 36 B) | 48 A) | 10 C9*) | 12 D1) | 4 D2) | 11 | 3-4 | 10 |
| 35* | 36 B) | 48 A) | 10 C10*) | 12 D1) | 4 D2) | 11 | 4 | 10 |
| 36* | 36 B) | 48 A) | 10 C11*) | 12 D1) | 4 D2) | 14 | 4 | 10 |

*) for comparison

We claim:
1. A thermoplastic molding material containing
   A) from 5 to 94.9% by weight of a polyester,
   B) from 5 to 94.9% by weight of a polyphenylene ether,
   C) from 0.1 to 50% by weight of a homopolymer or copolymer carrying primary or secondary amino groups at the chain ends prepared by anionically polymerizing a vinylaromatic compound or a diene or a mixture thereof, and reacting the resulting living anionic polymer chain with an aziridine or diaziridine and subsequently with a nucleophilic compound,
   D) from 0 to 40% by weight of an impact-modifying rubber,
   E) from 0 to 60% by weight of conventional additives and processing assistants.
2. A thermoplastic molding material as claimed in claim 1, in which component C) contains on average from 1 to 10 functional amino groups per macromolecule.
3. A thermoplastic molding material as claimed in claim 1, in which component C) has a molecular weight (weight average) of from 500 to 500,000.
4. A thermoplastic molding material as claimed in claim 1, in which component B) contains from 0 to 50% by weight of a vinylaromatic polymer which is different from C).

5. A thermoplastic molding material as claimed in claim 1, containing
  from 10 to 89.5% by weight of component A)
  from 10 to 89.5% by weight of component B) and
  from 0.5 to 30% by weight of component C).

6. A molding obtainable from a thermoplastic molding material as claimed in claim 1.

7. A thermoplastic molding material as claimed in claim 1 wherein the polyester component A) is a polyalklene terephthalate.

* * * * *